United States Patent
Kim et al.

(10) Patent No.: US 8,882,325 B2
(45) Date of Patent: *Nov. 11, 2014

(54) OPTICAL SHEET AND METHOD OF MANUFACTURING THE SAME

(71) Applicant: Samsung Display Co., Ltd., Yongin (KR)

(72) Inventors: Seung-Mo Kim, Yongin-si (KR); Jinsung Choi, Cheonan-si (KR); DongHoon Kim, Suwon-si (KR); Seunghwan Chung, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/093,869

(22) Filed: Dec. 2, 2013

(65) Prior Publication Data

US 2014/0085868 A1    Mar. 27, 2014

Related U.S. Application Data

(63) Continuation of application No. 13/180,283, filed on Jul. 11, 2011, now Pat. No. 8,616,753.

(30) Foreign Application Priority Data

Nov. 19, 2010 (KR) ........................ 10-2010-0115818

(51) Int. Cl.
| | |
|---|---|
| *F21V 7/04* | (2006.01) |
| *B32B 38/06* | (2006.01) |
| *G02F 1/1335* | (2006.01) |
| *B32B 37/26* | (2006.01) |
| *B32B 37/12* | (2006.01) |
| *B32B 37/15* | (2006.01) |

(52) U.S. Cl.
CPC ..... *G02F 1/133602* (2013.01); *B32B 2037/268* (2013.01); *B32B 37/26* (2013.01); *B32B 37/12* (2013.01); *B32B 38/06* (2013.01); *B32B 37/153* (2013.01); *G02F 1/133606* (2013.01); *B32B 2457/202* (2013.01); *G02F 2001/133607* (2013.01); *B32B 2310/0831* (2013.01)
USPC ........... 362/620; 362/625; 362/617; 362/626; 362/330

(58) Field of Classification Search
USPC .......... 362/617, 625, 626, 330, 332; 264/1.29
See application file for complete search history.

(56) References Cited

U.S. PATENT DOCUMENTS

| | | | | |
|---|---|---|---|---|
| 8,616,753 | B2 * | 12/2013 | Kim et al. | ...................... 362/620 |
| 2011/0063873 | A1 | 3/2011 | Parker et al. | |
| 2011/0188230 | A1 | 8/2011 | Lee et al. | |

FOREIGN PATENT DOCUMENTS

| | | | |
|---|---|---|---|
| JP | 07-128662 A | 5/1995 |
| KR | 10-2008-0024919 A | 3/2008 |
| KR | 10-2009-0124705 A | 12/2009 |
| KR | 10-2010-0025210 A | 3/2010 |

* cited by examiner

*Primary Examiner* — Ali Alavi
(74) *Attorney, Agent, or Firm* — Innovation Counsel LLP

(57) ABSTRACT

An optical sheet includes a light-passing base sheet, a plurality of light-passing first patterns formed on a front major surface of the base sheet, and a plurality of light-passing second patterns formed on a rear major surface of the base sheet. The first patterns protrude from the front surface of the base sheet, a top portion of each of the second patterns makes contact with the rear surface of the second patterns while a larger lower surface of each of the second patterns is exposed to serve as a light receiving surface. Voids having relatively low refractive indices are formed between the light-passing second patterns. The optical sheet employs just one base sheet in one embodiment, thereby reducing a manufacturing cost of the optical sheet.

22 Claims, 16 Drawing Sheets

OPTICAL SHEET AND METHOD OF MANUFACTURING THE SAME

CROSS-REFERENCE TO RELATED APPLICATION

This application is a continuation application of U.S. patent application Ser. No. 13/180,283 filed on Jul. 11, 2011, which claims priority to Korean Patent Application No. 10-2010-0115818 filed on Nov. 19, 2010; where the disclosures of both said applications are incorporated herein by reference in their entirety.

BACKGROUND

1. Field of Disclosure

The present disclosure of invention relates to an optical sheet for use in a backlit liquid crystal display and a method of manufacturing the optical sheet.

2. Description of Related Technology

In general, a liquid crystal display (LCD) displays an image using change in optical transmittance attributes (e.g., polarization) of liquid crystals according to correspondingly applied voltages. To this end, the liquid crystal display typically includes a backlight unit and a liquid crystal display panel.

The backlight unit provides light to a back or rear portion of the liquid crystal display panel. A user of the LCD apparatus views a formed image by facing a front portion of the LCD panel. The backlight unit generally includes a light source that can emit white and/or other light and optical sheets that control an optical path and shape of the backlight output light to improve brightness and uniformity of the light before it is provided to the liquid crystal display panel.

For liquid crystal displays in recent times, it is desired to have features like greater slimness and lower power consumption and to develop backlight units having lower manufacturing costs and higher brightness levels so as to be cost competitive and feature competitive.

It is to be understood that this background of the related technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

One way to reduce power consumption is to increase the efficiency of light transference as such occurs for example between the backlighting source and a prismatic portion of the backlight optics section. More specifically, in conventional prismatic films of plates, the underneath portion has prismatic structures with downwardly pointing apexes. Incident light that strikes the sloped surfaces of these conventional underneath prismatic structures is partially reflected at the air-to-polymer interface. However, in accordance with one aspect of the present disclosure, the air-to-polymer interface is inverted so that incident light from underneath does not directly strike it when incoming, but rather exits from that inverted air-to-polymer interface (where the inverted air-to-polymer interface could be called a polymer-to-air interface, or P2A-IF for short). As a result, reflection losses are reduced and efficiency of light transference is improved, thus enabling reduced power consumption. Additionally, the thickness of the prismatic portion of the backlight optics section can be reduced when the polymer-to-air interface (P2A-IF) configuration is used.

Exemplary embodiments of the present disclosure additionally, provide a prismatic optical sheet that is capable of reducing manufacturing cost and improving reliability.

Exemplary embodiments of the present disclosure include a method of manufacturing the optical sheet.

According to an exemplary embodiment, an optical processing sheet includes a light-passing base sheet formed of a first material having a respective relatively high refractive index. A plurality of light-passing first patterns are provided protruding from an upper, front surface of the base sheet, and a plurality of light-passing second patterns are provided as attached to a lower, rear surface of the base sheet. The first and second patterns are formed of respective materials having respective relatively high refractive indices. Voids are created between the second pattern to thus create a lightpasser-to-air interface (LP2A-IF) configuration which reduces back reflection of incoming light that comes into the bottoms of the second patterns for processing thereby. In one embodiment, the second patterns provide a light converging function in a first set of parallel planes each extending in a first direction (D1).

In one embodiment, the first patterns protrude from the front surface of the base sheet and have a prism mountain shape extending longitudinally in the first direction so as to provide a light converging function in a second set of parallel planes each extending in a second direction (D2) different from the first direction (D1). The second direction may be perpendicular to the first direction.

Lower base vertices of the second patterns are connected one to the next for example with a flexible and light-passing adhesive. Each of the second patterns has a trapezoidal prismatic shape in one embodiment that extends longitudinally in the second direction. The optical sheet may further include a protective layer disposed on the lower surface of the second patterns to prevent the second patterns from being easily separated.

According to an exemplary method of manufacture, the optical processing sheet is provided as follows. A plurality of second patterns are releasably adhered to a top surface of an auxiliary base sheet or plate such that the second patterns protrude upwardly therefrom, and a plurality of first patterns are formed on an upper, front surface of a base sheet to allow the first patterns to protrude upwardly therefrom. Then, an adhesive layer is formed on a rear surface of the base sheet, and the structure on top of the auxiliary base sheet is coupled with the base sheet such that the second patterns make contact with the adhesive layer. After that, the auxiliary base sheet is releasably removed to expose a lower surface of the second patterns.

Other aspects of the present teachings will become apparent from the below detailed description.

BRIEF DESCRIPTION OF THE DRAWINGS

The above and other advantages of the present teachings will become readily apparent by reference to the following detailed description when considered in conjunction with the accompanying drawings wherein.

DETAILED DESCRIPTION

Figure 1:
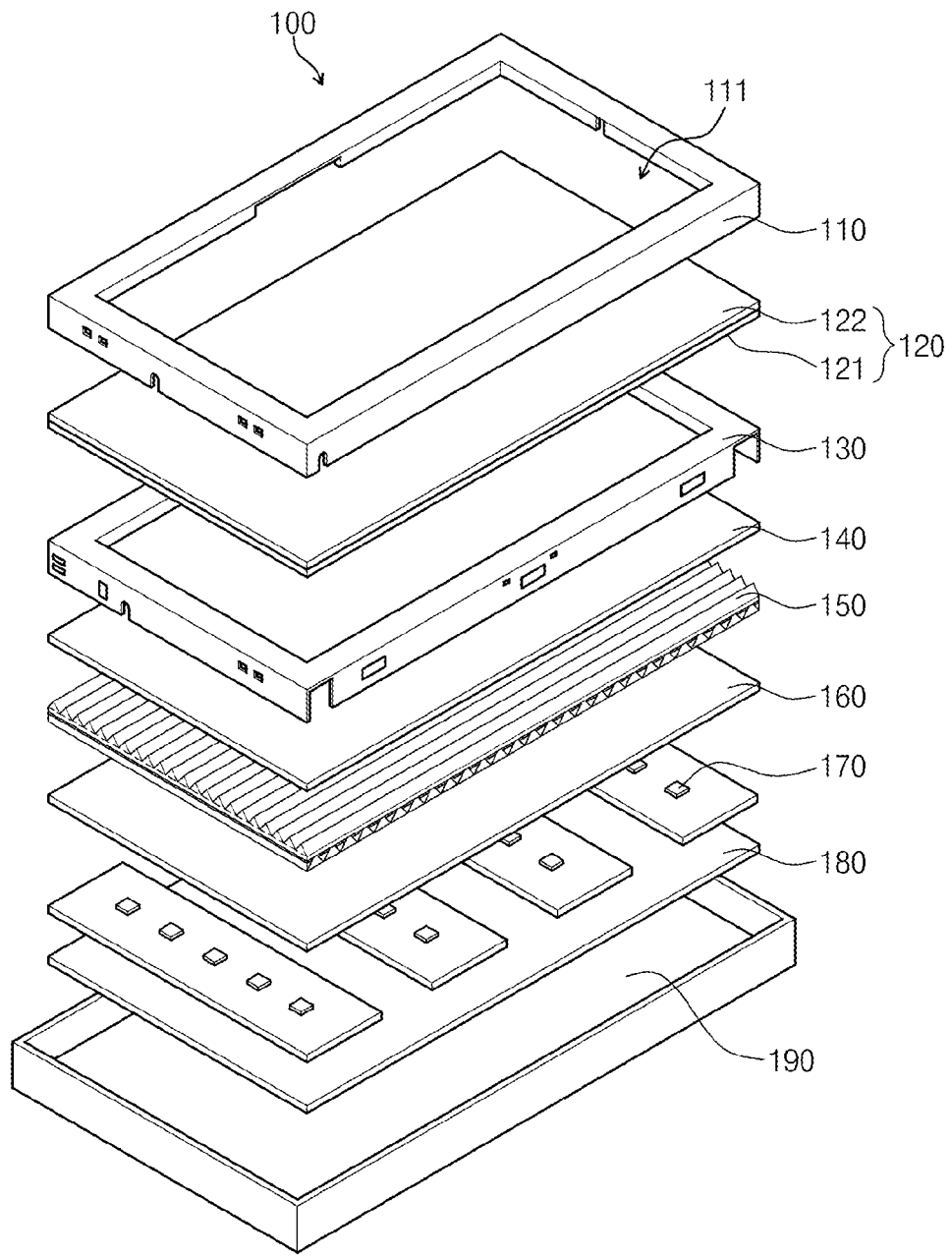
FIG. 1 is an exploded perspective view showing a display apparatus with an optical sheet structured according to an exemplary first embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

FIG. 1 is an exploded perspective view showing a display apparatus with a prismatic optical sheet structured and disposed according to an exemplary first embodiment of the present disclosure.

Referring to FIG. 1, a display apparatus 100 includes an upper cover or housing piece 110, a lower cover or housing piece 190, a display panel 120, a mold frame 130 disposed and structured to support the display panel 120, and a backlight unit disposed and structured to provide white and/or other light to the display panel 120. The display panel 120, the mold frame 130, and the backlight unit are disposed between the upper cover 110 and the lower cover 190.

The upper cover 110 covers a front surface of the display panel 120 and thus protectively houses a corresponding front part of the display panel 120. The upper cover 110 is provided with a window 111 to expose a display area of the display panel 120. The upper cover 110 may be provided with a fastening or coupling mechanism such as a screw hole (not shown) at a side surface thereof for securing the upper cover 110 to another portion of the assembly 100. The lower cover 190 is disposed and structured to receive and house at least a rear portion of the display panel 120 and to receive and house the backlight unit.

The display panel 120 displays an image toward a front side thereof. In the present exemplary embodiment shown in FIG. 1, the display panel 120 is a liquid crystal display (LCD) panel, but it should not be limited thereto or thereby and other types of flat panel displays (e.g., electrophoretic) which may use prismatic optical sheets are understood to be within the contemplation of the disclosure.

The display panel 120 includes a first substrate 121, a second substrate 122 facing the first substrate 121, and a liquid crystal layer (not shown) disposed between the first substrate 121 and the second substrate 122. The first substrate 121 includes a plurality of pixel electrodes and the second substrate 122 includes a common electrode. The display panel 120 includes or is operatively coupled to a circuit (not shown) that selectively applies respective voltages to respective one of the pixel electrodes so as to thus create electric fields extending to the common electrode and the arrangement or alignment of liquid crystal molecules in the liquid crystal layer is thus controlled by the electric fields formed between the pixel electrodes and the common electrode, thereby displaying a desired image toward the front side of the assembly 100. The first substrate 121 may further include a plurality of thin film transistors each coupled to a respective pixel-electrode and the second substrate 122 may further include a plurality of color filters such as Red, Green and Blue color filters disposed above respective ones of the pixel-electrodes.

The mold frame 130 is disposed under the display panel 120 to support the display panel 120. The mold frame 130 has a rectangular annular shape which corresponds with non-displaying peripheral edge areas of the display panel 120.

The backlight unit is disposed below the mold frame 130 to provide light through the mold frame 130 to the display area of the display panel 120. The illustrated backlight unit includes a plurality of discrete light sources 170, a reflective sheet 180, an optical sheet 150, a diffusion sheet 160, and a protective sheet 140.

The light sources 170 each emit respective white or other light. In FIG. 1, the light sources 170 are disposed over substantially an entire rear surface area of the display panel 120, but they should not be limited thereto. That is, the light sources 170 may be alternatively or additionally positioned at the outermost edges of the rear surface area of the display panel 120 so as to provide so-called, edge lighting. In one embodiment, light emitting diodes (LED's) are used as the light sources 170, but the light sources 170 may include cold cathode fluorescent lamps, external electrode fluorescent lamps, or hot cathode fluorescent lamps.

The reflective sheet 180 is disposed under the light sources 170 to reflect light that has not been directly projected toward the front part of the display panel 120 such that the reflected light travels toward the front part of the display panel 120.

The diffusion sheet 160 is disposed above the light sources 170 to diffuse the light from the discrete light sources 170 and thus reduce the discrete nature of that light by making it more homogenous. In one embodiment, the diffusion sheet 160 has substantially flat upper and lower major surfaces and light diffusing agents embedded within its body. More specifically, at least the upper major surface is substantially flat so as to enable a correspondingly flat, lower major surface of the optical sheet 150 to mate there with without having an air pocket interposed between the diffusion sheet 160 and the overlying optical sheet 150.

The optical sheet 150 is disposed above the diffusion sheet 160 (optionally makes direct contact with the diffusion sheet 160) and it is structured to receive the diffused light rays output by the diffusion sheet 160 and to project the received rays upwardly in a direction substantially perpendicular to the front and rear major surfaces of the display panel 120. Details of the optical sheet 150 will be described later.

The protective sheet 140 is disposed on the optical sheet 150 to protect the optical sheet 150 from scratching, chemical corrosion and/or the like. In the present exemplary embodiment, the protective sheet 140 may be omitted from the backlight unit, and the backlight unit may further include a polarizing film or a brightness enhancing film in addition to or instead of the protective sheet 140.

Figure 2:
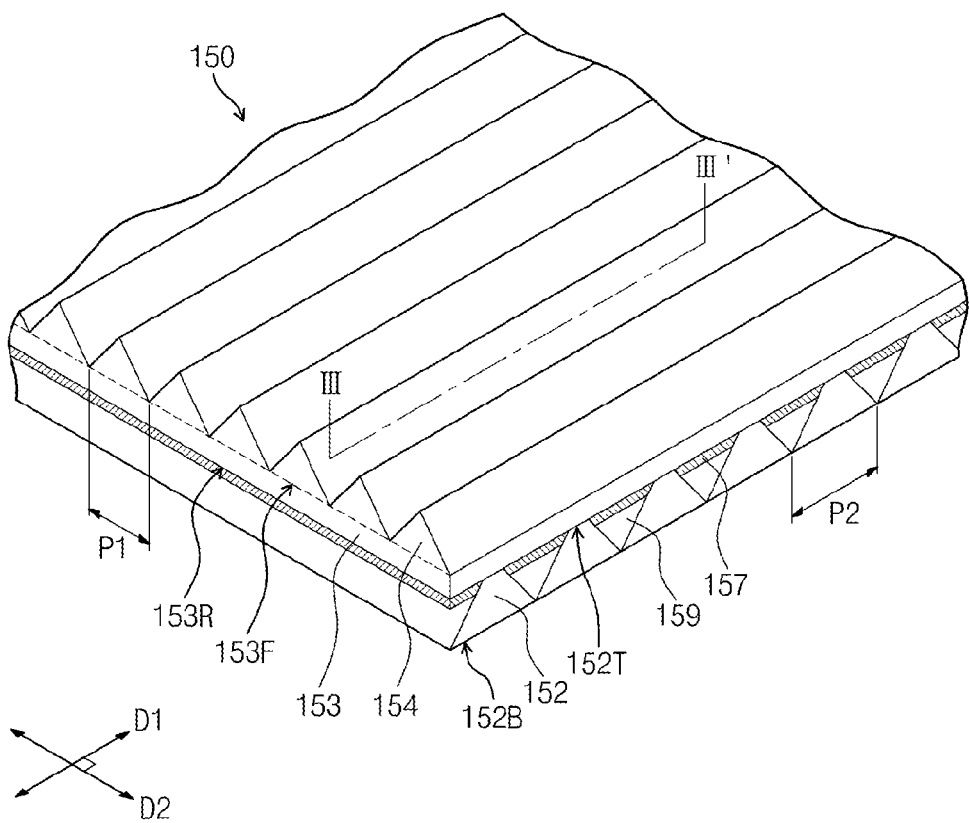
FIG. 2 is a perspective view showing an optical sheet according to the first exemplary embodiment wherein a lower prismatic portion includes a polymer-to-air interface (P2A-IF) configuration rather than an air-to-polymer interface configuration.
Figure 3:
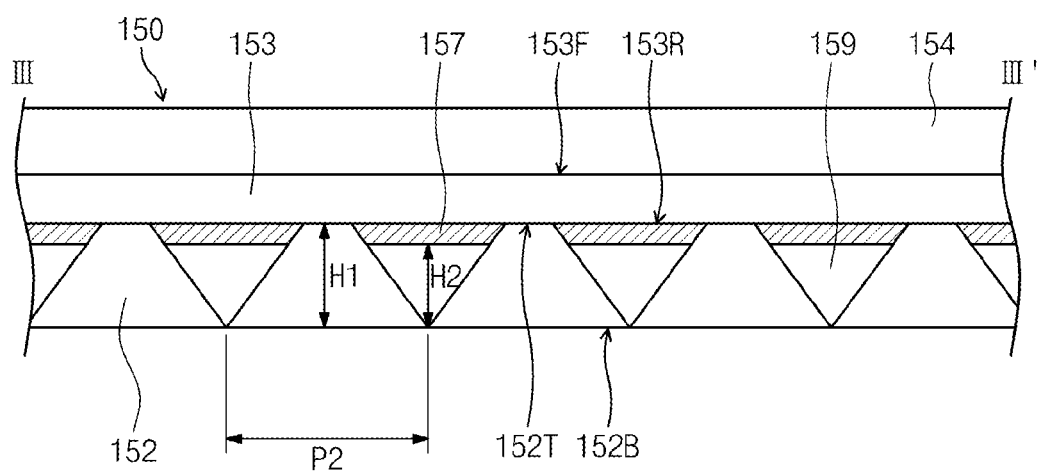
FIG. 3 is a cross-sectional view taken along a line III-III' of FIG. 2.

FIG. 2 is a perspective view showing an optical sheet according to a first exemplary embodiment of the present disclosure, and FIG. 3 is a cross-sectional view taken along a line III-III' of FIG. 2.

Referring to FIGS. 2 and 3, the optical sheet 150 includes a light-passing base sheet 153 having front and rear major surfaces respectively denoted as 153F and 153R. The optical sheet 150 further includes a plurality of first patterns 154 disposed on the front surface 153F of the base sheet, and a plurality of second patterns 152 disposed on the rear surface 153R of the base sheet. In one embodiment, each of the base sheet 153, the first patterns 154 and the second patterns 152 is respectively composed of a respective light-passing material having an index of refraction ($n_j$) greater than that of air.

The base sheet 153 has a rectangular plate shape when viewed from the front. The base sheet 153 may be formed of a light-passing material such as one that is formed from polymer resin such as polyethylene terephthalate (PET) and the base sheet 153 may have a thickness of about 125 micrometers to about 250 micrometers.

The first patterns 154 (e.g., triangle-ended prisms) are disposed on and make contact with and substantially cover the front surface 153F of the base sheet. The first patterns 154 protrude upwardly along a normal line direction of the front surface 153F. Each of the first patterns 154 extends longitudinally in a first direction D1 and has a substantially triangular or mountainous shape when viewed in the cross sectioning plane of second direction D2. In one embodiment, the mountain shaped first patterns 154 are disposed one after the next along the front surface 153F of the base sheet to have a pitch dimension (P1) of about 50 micrometers to about 100 micrometers. The first patterns 154 may be formed of an acrylic-based polymer resin, and each mountain shape may have a height of about 25 micrometers to about 30 micrometers The first patterns 154 may optically operate in a manner similar to convex lenses and may thus refract light that is incident to their rear or base portions (154R) as upwardly more focused or more collected light that is aimed at the LCD panel above them. Since the first patterns 154 extend longitudinally in the first direction D1, the light is caused to be more collected or more converged in the plane of the second direction D2, where the latter is perpendicular to the first direction D1.

The second patterns 152 are disposed on the rear surface 153R of the base sheet 153. However unlike the first patterns 154, the second patterns 152 do not make essentially direct contact with substantially the entire surface area of the rear surface 153R and instead the second patterns 152 are shaped to create air pockets 159 (or more broadly speaking, regions of relatively low refractive index) near the rear surface 153R of the base sheet. On the other hand, the collective underneath surface (all the 152B's combined) presents a substantially continuous flat and light receiving surface of relatively high refractive index to incoming light rays arriving thereto, for example, from the diffusion sheet 160. This configuration allows for improved efficiency of transference of light energy (e.g., reduced back reflection) from the diffusion sheet 160 to the optical sheet 150 as shall become clearer from the more detailed description below.

Each of the second patterns 152 extends longitudinally in the second direction D2 as a prism having substantially trapezoidal ends or frusto-mountain shapes. In other words, and as shown in FIGS. 2 and 3, a top portion of each of the second patterns 152 is cut flat, so that each of the second patterns 152 has an upper surface 152T of lateral dimension smaller than the bottom portion or base 152B of the trapezoidal shape. The flat topped, small upper surfaces 152T of the second patterns 152 run substantially parallel to the rear surface 153R of the base sheet so as to thereby allow the second patterns 152 to almost contiguously couple with the material of the base sheet 153. Stated otherwise, each of the second patterns 152 has a trapezoid shape at its cross sectional view when seen in a plane extending in the first direction D1. The second patterns 152 may be formed of a light-passing material of refractive index greater than air such as of an acrylic-based polymer resin. When the second patterns 152 are attached to the of the base sheet 153, as will be described, a separate and additional base sheet is not required to support the lower portions (152B) of the second patterns 152 in the finished LCD apparatus 100 and thus the thickness of the LCD apparatus 100 is not increased by inclusion of such an additional base sheet (not shown). Instead, the lower surfaces 152B of the second patterns 152 are exposed so that they can make direct contact with the next lower portion of the finished LCD apparatus 100 (e.g., the diffusion sheet 160), where this direct contact with the next lower portion (e.g., 160) can occur without making contact with air or another medium of relatively low refractive index and thus back reflection of incoming light (light coming up from the yet lower backlight sources 170) can be reduced and energy coupling can be improved.

The upper surface 152T of each of the second patterns 152 makes direct contact with a corresponding portion of the rear surface 153R of the base sheet. The lower surfaces 152B of adjacent ones of the second patterns 152 are essentially or substantially connected to each other so that air pockets 159 of substantially prismatic form with triangle ends are formed under portions of the rear surface 153R which are not contacted by the upper surfaces 152T of the second patterns 152. As mentioned above, this formation of the prismatic air pockets 159 above the collective surface area of the bottom surfaces (combined 152B's) of the second patterns 152 may be referred to as a polymer-to-air interface (P2A-IF) configuration. In the present exemplary embodiment, the width dimension of the lower surface 152B in the first direction D1 of each second pattern 152 is greater than the width dimension of the upper surface 152T thereof in the first direction D1.

The width of the lower surface 152B (which corresponds with air pocket pitch P2) may be about 50 micrometers to about 100 micrometers in the first direction D1. In one embodiment, the pitch P2 of the formed, prismatic air pockets 159 is made to be larger than the pitch P1 (FIG. 2) of each of the overlying first patterns 154. This difference in pitches (P2>P1) can operate to improve the light-collecting (light un-diffusing) efficiency. In addition, each of the second patterns 152 may have a height H1 of about 25 micrometers to about 30 micrometers similar to that of the first patterns 154.

The substantially trapezoidal second patterns 152, because they are surrounded by air pockets 159, can operate as convex lens that collect (un-diffuse) the light rays incident thereto from underneath so that the light rays converge more when traveling towards the front of the LCD panel (in a D3 direction, not shown). Since the prismatic frusto-mountain shape of each of the second patterns 152 appears in planes extending in the first direction D1, the light is collected or converged in such planes of the first direction D1.

As described above, the light emitted from the light sources 170 is more collected (more converged) in the first and second directions D1 and D2 after passing through the second patterns 152 and the first patterns 154, and thus most of the pre-diffused light that is provided from the underlying diffusion sheet 160 to the optical sheet 150 may be further relayed, with little loss due to back reflection to the overlying display panel 120. As a result of this improved transfer of light energy, the light sources 170 may be operated at lower power levels and power consumption may be reduced, thereby enabling longer battery life in portable devices (e.g., laptop computers) that employ the here disclosed optical sheet 150.

In one embodiment, an adhesive layer 157 is pre-coated on the rear surface 153R of the base sheet 153 to assist in attaching the top surfaces 152T of the second patterns 152 to the base sheet 153. The second patterns 152 are pressed substantially through the adhesive coating (157) so that, as shown in FIG. 3, the adhesive coating is substantially pushed aside to form thickened areas of adhesive adjacent to sides of the top surfaces 152T and the subsequently hardened adhesive layer 157 thus surrounds the upper portions of the second patterns 152 and thus affixes the second patterns 152 to the lower surface 153R of the base sheet 153.

At its thickest parts, the hardened adhesive layer 157 may have a thickness of about 0.1 micrometers to about 5 micrometers and it may be formed of a relatively high refractive index material such as at least one of an acrylic-based polymer resin, a polyester-based polymer resin, or a polycarbonate-based polymer resin. The adhesive layer 157 may have distributed therein at least one light diffusing agent such as an organic diffusing agent or inorganic diffusing agent to diffuse the light passing through the thick parts of the adhesive layer 157. Thus, even though the air pockets 159 may be viewed as operating like concave rather than convex lenses (due to their relatively low refractive index), the embedded light diffusing agent(s) in the thick parts of the adhesive layer 157 soften the undesired optical effects (light diverging rather than light converging) of the air pockets 159. Although not shown in the figures, it is to be understood that a very thin portion of the adhesive layer 157 may remain between the rear surface 153R of the base sheet 153 and the upper surface 152T of the second patterns 152 after press attachment, thereby enhancing adhesive force between the base sheet 153 and the second patterns 152.

As mentioned, an air layer 159 is created between the second patterns 152 but above the collective light receiving surface formed by the close together or touching or flexibly joined (by trace amounts of adhesive) lower surfaces 152B of the second patterns 152. According to Snell's law, a bending angle of light becomes larger as a difference of refractive indices between two interface mediums becomes larger. Since the air in pockets 159 has a relatively low refractive index (about 1.0) as compared with that (>1) of the other materials mentioned here, the light-collecting efficiency of the optical sheet 150 may be improved due to difference in refractive indices as between the material of the second patterns 152 and the interfacing air layer 159. (It is also within the contemplation of the present disclosure to fill the air pockets 159 with a light-passing material that has a relatively low refractive index. However such may disadvantageously operate to increase costs and reduce the light converging efficiency of the optical sheet 150.) The air layer 159 has a height H2 smaller than the height H1 of the second patterns 152 and corresponding to a difference between the height of the thick portions of the adhesive layer 157 and the height H1 of the second patterns as shown in FIG. 3. That is, since the adhesive layer 157 has the height of about 0.1 micrometers to about 5 micrometers in its thickest portions, the height H2 of the air layer 159 corresponds to a value of about 0.75 times (i.e., 75%) the height H1 of the second patterns 152 in one embodiment.

The optical sheet 150 having the-above described stricture may have the light-collecting efficiency higher than that of a conventional prism sheet where the conventional air-to-polymer interface configuration (not shown) is used. (Although not directly illustrated, the so-called, conventional air-to-polymer interface configuration may be imagined by taking a copy of first patterns 154 as shown in FIG. 2, collectively flipping them upside down and substituting that flipped copy in place of illustrated second patterns 152 of FIG. 2.) In addition, the optical sheet 150 includes the first patterns 154 and the second patterns 152 that are extending in the direction perpendicular to the first patterns 154, so that the optical sheet 150 may collect (converge) the light in the planes of both axes as the light travels from the rear (152B) to the front side of the optical sheet 150. In addition, since the air layer having the relatively high refractive index is formed between the second patterns 152, the light-collecting efficiency for the light passing through the optical sheet 150 may be improved.

In addition, the optical sheet 150 employs just one base sheet 153 for holding the assemblage together, and thus the manufacturing cost for the optical sheet 150 may be reduced. According to the structure of the optical sheet 150, the base sheet 153 may be prevented from being curled or wrinkled due to a difference of heat expansion coefficients between the layers on which the first and second patterns 154 and 152 are formed and the layer of the base sheet 153 because, for example, they are made of same or similar polymer materials. As a result, the optical sheet 150 may have improved reliability.

Figure 4:
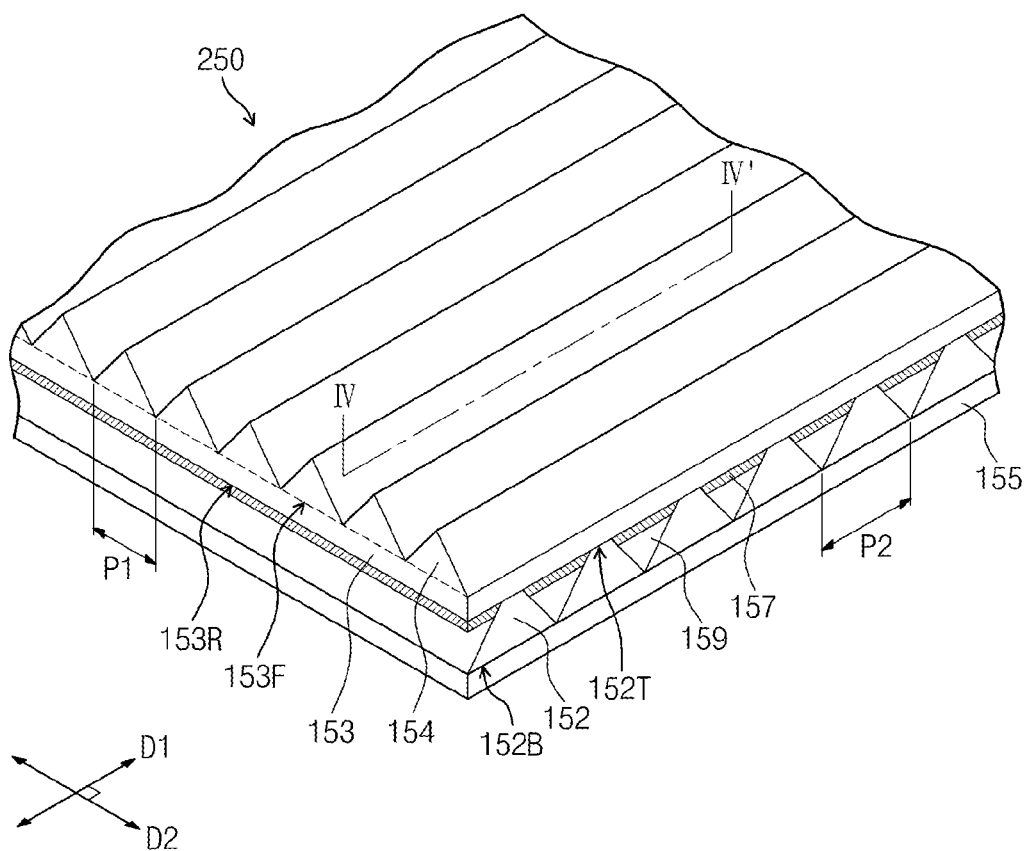
FIG. 4 is a perspective view showing an optical sheet according to a second exemplary embodiment.
Figure 5:
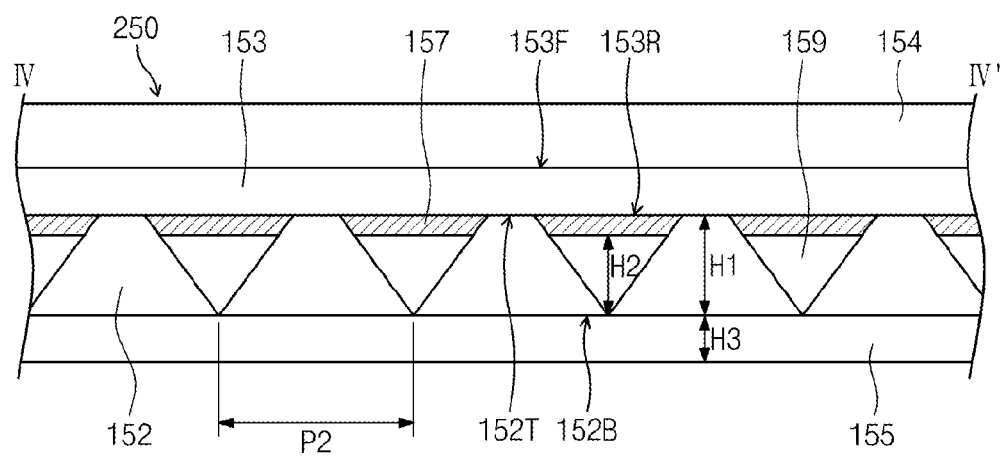
FIG. 5 is a cross-sectional view taken along a line IV-IV' of FIG. 4.

FIG. 4 is a perspective view showing an optical sheet according to a second exemplary embodiment, and FIG. 5 is a cross-sectional view taken along a line IV-IV' of FIG. 4. In FIGS. 4 and 5, the same reference numerals denote the same elements in FIGS. 1 to 3, and thus detailed description of the same elements will be omitted.

Referring to FIGS. 4 and 5, an optical sheet 250 includes a base sheet 153, a plurality of first patterns 154, a plurality of second patterns 152, and a protective layer 155. The protective layer 155 is formed substantially over the entire collective lower surface (152B's) of the second patterns 152 so as to substantially entirely cover and protect the lower surface of the second patterns 152. The protective layer 155 may interface with the underlying diffusion sheet 160.

As shown in FIGS. 4 and 5, the second patterns 152 are not only connected to each other by only the adhesive 157 at the upper surfaces 152T thereof but also by means of the protective layer 155. That is, if connection is provided only by the adhesive 157, the second patterns 152 may easily become separated one by one from the base sheet 153 when external impacts are applied to the second patterns 152. However, as shown in FIGS. 4 and 5, when the protective layer 155 is formed on and adhered to the lower surfaces 152B of the second patterns 152, the second patterns 152 may be prevented from being separated from the base sheet 153.

The protective layer 155 may include an acrylic-based polymer resin or a polyurethane-based polymer resin. In addition, the protective layer 155 may include the same material as the second patterns 152 and may be integrally formed with the second patterns 152. In one embodiment, the protective layer 155 is formed of a material different from that of the base sheet 153.

In order to sufficiently support the second patterns 152, the protective layer 155 has a thickness H3 of about 5 micrometers or more, which corresponds to a value of 0.25 times (25%) or more the height H1 of the second patterns 152. For instance, in the case that each of the second patterns 152 has the height H1 of about 25 micrometers to about 30 micrometers, the protective layer 155 may have the thickness H3 of about 5 micrometers to about 10 micrometers. As the thickness H3 of the protective layer 155 becomes thicker, the separation of the second patterns 152 may be more effectively prevented. However, it is preferable that the thickness H3 of the protective layer 155 is smaller than the height H1 of the second patterns 152 in consideration of process conditions and also because this helps to reduce the overall thickness of the optical sheet 250.

The optical sheet 250 according to the second exemplary embodiment is obtained by adding the protective layer 155 to the optical sheet 150 according to the first exemplary embodiment. Accordingly, the optical sheet 250 may prevent the base sheet 153 from being curled or wrinkled and reduce the manufacturing cost thereof. In addition, since the optical sheet 250 may prevent the second patterns 152 from being separated by using the protective layer 155, adhesive force between the second patterns 152 may be enhanced.

In the first and second exemplary embodiments, the first patterns 154 and the second patterns 152 have been schematically represented as having the shape of the prism mountain, but they should not be limited thereto or thereby. Any appropriate shape for providing the desired light convergence function may be used, for example half cylinders as are shown in FIG. 6.

Figure 6:
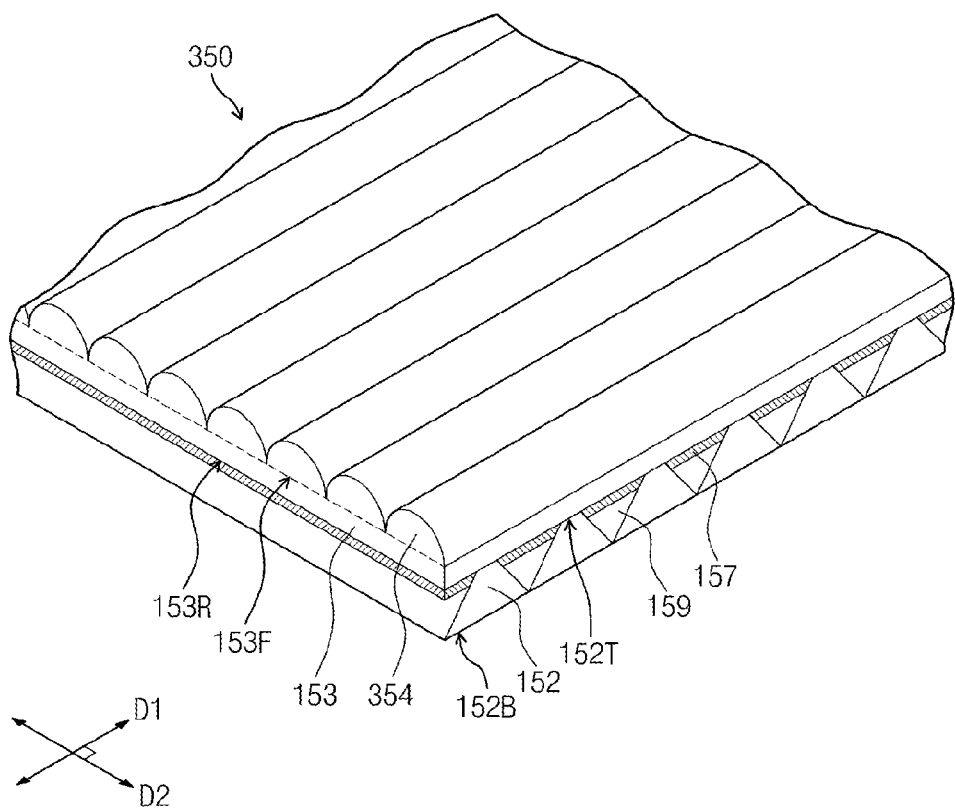
FIG. 6 is a perspective view showing an optical sheet according to a third exemplary embodiment.
Figure 7:
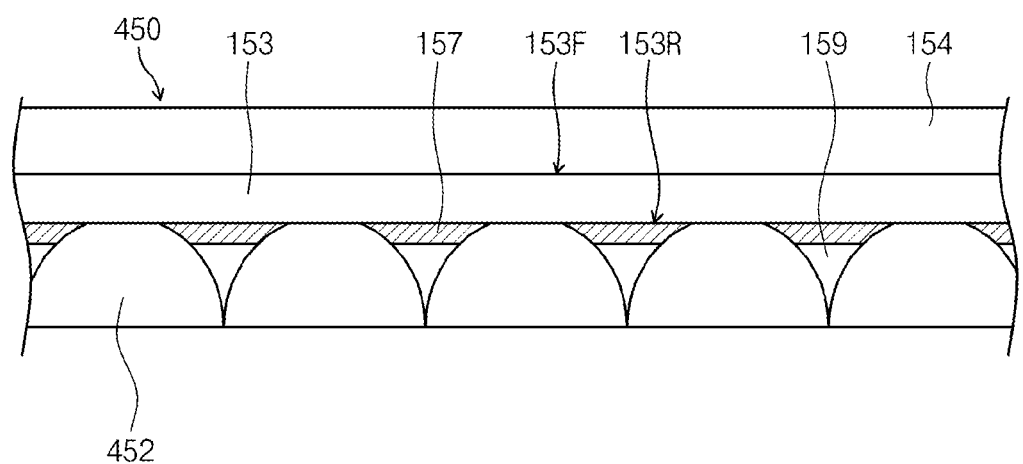
FIG. 7 is a cross-sectional view showing an optical sheet according to a fourth exemplary embodiment.

Referring to the specifics of FIG. 6, this is a perspective view showing an optical sheet 350 according to a third exemplary embodiment. FIG. 7 is a cross-sectional view showing an optical sheet 450 according to yet a fourth exemplary embodiment.

In FIG. 6, the optical sheet 350 includes first patterns 354, each having a lenticular shape (e.g., half cylindrical). The first patterns 354 have the light-collecting efficiency different from that of the first patterns 154 in the first exemplary embodiment. In addition, although not shown in FIG. 6, the first patterns 254 may have various shapes, such as a half-circular shape, a half-oval shape, a hybrid pyramid-rounded apex shape, etc., instead of the lenticular shape.

Referring to FIG. 7, an optical sheet 450 includes second patterns 452, each having a lenticular shape of which an upper surface is parallel to the base sheet 153 by cutting away the upper portion of the second patterns 252. Similar to the third exemplary embodiment, the second patterns 452 may have various shapes, such as a half-circular shape of which the upper portion is cut away, a half-oval shape of which the upper portion is cut away, a pyramid shape of which the upper portion is cut away, instead of the lenticular shape of which the upper portion is cut away.

As described above, the first and second patterns may have various shapes, thereby variously controlling the light-collecting efficiency. In addition, the base sheet 153 may be prevented from being curled or wrinkled due to a heat expansion coefficient difference between layers on which the first and second patterns 354 and 452 are formed and the layer of the base sheet 153. As a result, the optical sheet 350/450 may have improved reliability.

Figure 8:
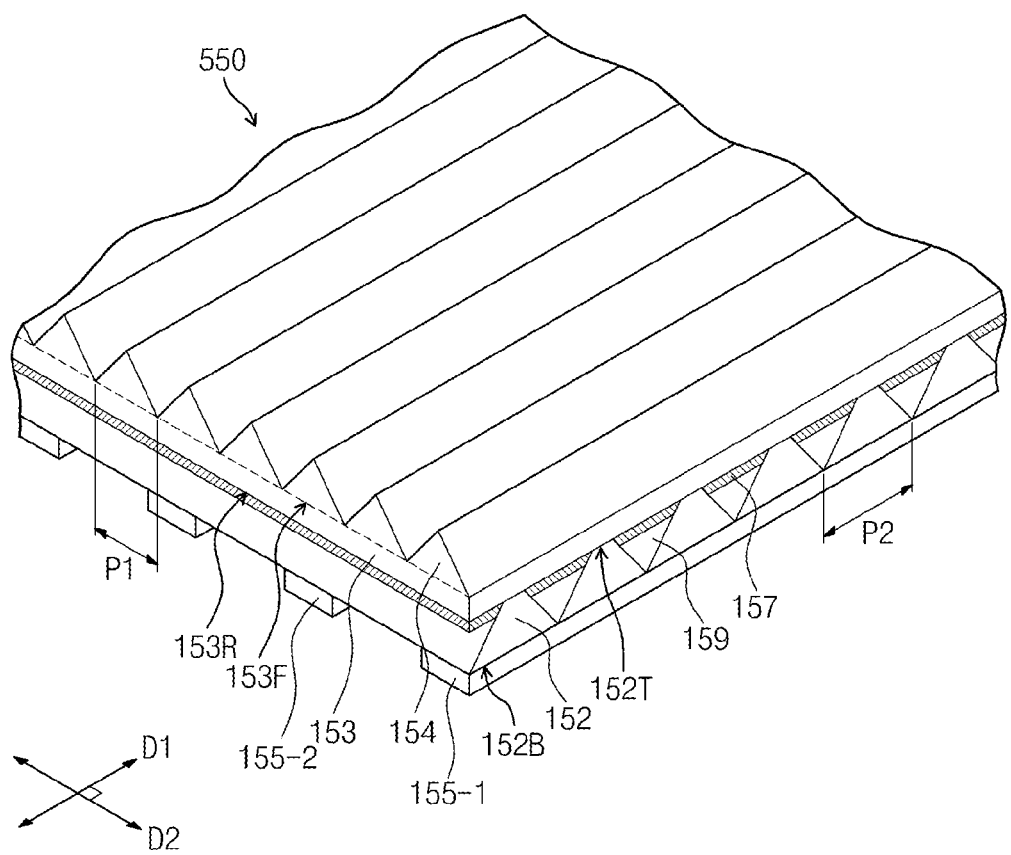
FIG. 8 is a perspective view showing an optical sheet according to a fifth exemplary embodiment.

FIG. 8 is a perspective view showing an optical sheet 550 according to a fifth exemplary embodiment.

Referring to FIG. 8, an optical sheet 550 includes a base sheet 153, a plurality of first patterns 154, a plurality of second patterns 152, and a protective layer. The protective layer (150-1, 150-2, . . . , 150-N) is disposed below the second patterns 152. The protective layer includes a plurality of rib or bar like supporters 155-1 and 155-2 that are extended longitudinally in the first direction D1 and arranged in spaced apart fashion along the second direction D2.

The supporters 155-1, 150-2, . . . , 150-N may be formed of a light-passing material that is formed from an acrylic-based polymer resin or a polyurethane-based polymer resin. The supporters 155-1, 155-2, etc. may include the same material as used for the second patterns 152 and may be monolithically integrally formed with the second patterns 152.

In FIG. 8, the supporters 155-1, 155-2, etc. are spaced apart from each other while being disposed below the second patterns 152, but they should not be limited thereto or thereby. That is, the supporters may be disposed only on a side surface of the optical sheet 550.

In order to sufficiently support the second patterns 152, the supporters 155-1, 155-2, etc. 2 have a thickness of about 5 micrometers or more, which corresponds to a value of 0.25 times (25%) or more the height of the second patterns 152. For instance, in the case that each of the second patterns 152 has the height of about 25 micrometers to about 30 micrometers, the supporters 155-1, 155-2, etc. may have the thickness of about 5 micrometers to about 10 micrometers. As the thickness of the supporters 155-1, 155-2, etc. becomes thicker, the separation of the second patterns 152 may be more effectively prevented. However, it is preferable that the thickness of the supporters 155-1, 155-2, etc. is smaller than the height of the second patterns 152 in consideration of process conditions.

In addition, the optical sheet 550 employs one base sheet 153 to collect the light, and thus the manufacturing cost for the optical sheet 150 may be reduced. The optical sheet 550 may prevent the base sheet 153 from being curled or wrinkled. In addition, since the optical sheet 550 may prevent the second patterns 152 from being separated by using the supporters 155-1 and 155-2, adhesive force between the second patterns 152 may be enhanced.

Figure 9:
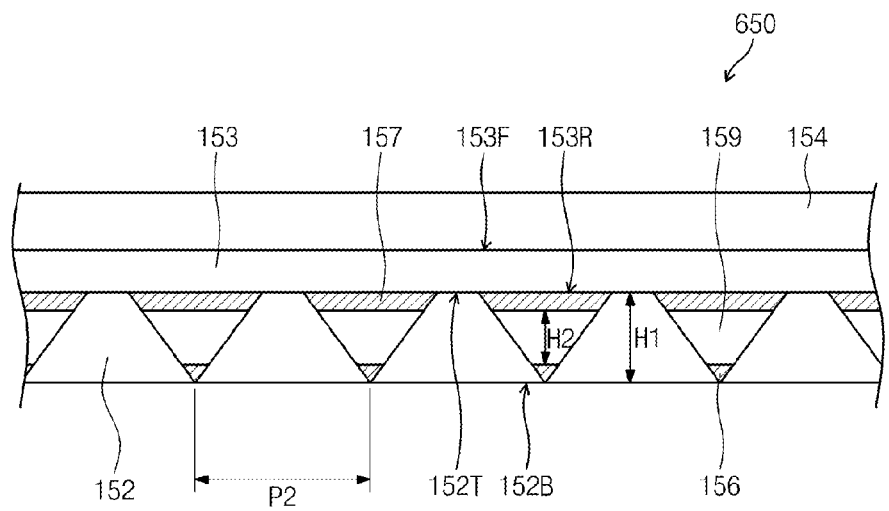
FIG. 9 is a cross-sectional view showing an optical sheet according to a sixth exemplary embodiment.

FIG. 9 is a cross-sectional view showing an optical sheet according to a sixth exemplary embodiment.

Referring to FIG. 9, an optical sheet 650 includes a base sheet 153, a plurality of first patterns 154, a plurality of second patterns 152, and a second adhesive layer 156. The second adhesive layer 156 is disposed between the second patterns 152 to connect ends of two adjacent second pattern bottoms 152B. In detail, each of the second patterns 152 has the shape of the prism mountain, and the second adhesive layer 156 covers an area at which a base vertex of a first prism mountain meets a base vertex of an adjacent second prism mountain, thereby preventing the second patterns 152 from being easily separated from each other.

The second adhesive layer 156 may include the same material as the adhesive layer 157 that fixes the second patterns 152 to the base sheet 153. That is, the second adhesive layer 156 may be formed of at least one of an acrylic-based polymer resin, a polyester-based polymer resin, or a polycarbonate-based polymer resin. The adhesive layer 157 may include at least one diffusing agent of organic diffusing agent or inorganic diffusing agent to diffuse the light passing therethrough. The second adhesive layer 156 may have a thickness of about 0.1 micrometers to about 5 micrometers.

The optical sheet 650 includes one base sheet 153 to collect the light, and thus the manufacturing cost for the optical sheet 650 may be reduced. The optical sheet 650 may prevent the base sheet 153 from being curled or wrinkled. In addition, the optical sheet 650 may prevent the second patterns 152 from being separated by using the second adhesive layer 156, thereby enhancing the adhesive force between the second patterns 152.

Figure 10:
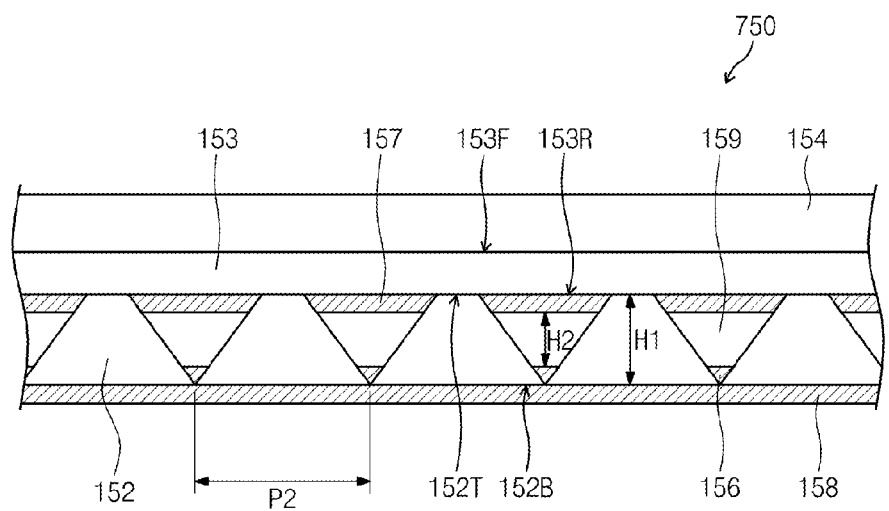
FIG. 10 is a cross-sectional view showing an optical sheet according to a seventh exemplary embodiment.

FIG. 10 is a cross-sectional view showing an optical sheet according to a seventh exemplary embodiment.

Referring to FIG. 10, an optical sheet 750 includes a base sheet 153, a plurality of first patterns 154, a plurality of second patterns 152, a second adhesive layer 156, and a protective layer 158. The second adhesive layer 156 is disposed between the second patterns 152 to connect ends of two adjacent second patterns 152. In detail, each of the second patterns 152 has the shape of the prism mountain, and the second adhesive layer 156 covers an area at which a base vertex of the prism mountain meets a base vertex of the adjacent prism mountain, thereby preventing the second patterns 152 from being separated from each other.

The second adhesive layer 156 may include the same material as the adhesive layer 157 that fixes the second patterns 152 to the base sheet 153. That is, the second adhesive layer 156 may be formed of at least one of an acrylic-based polymer resin, a polyester-based polymer resin, or a polycarbonate-based polymer resin. The adhesive layer 157 may include at least one diffusing agent of organic diffusing agent or inorganic diffusing agent to diffuse the light passing therethrough. The second adhesive layer 156 may have a thickness of about 0.1 micrometers to about 5 micrometers.

The protective layer 158 is disposed below the lower surface of the second patterns 152 to prevent the second patterns 152 from being separated. The protective layer 158 may include the same material as the protective layer 155 provided with the optical sheet 350 according to the third exemplary embodiment, or as the second patterns 156.

The optical sheet 750 of FIG. 10 includes one base sheet 153 to collect the light, and thus the manufacturing cost for the optical sheet 750 may be reduced. The optical sheet 750 may prevent the base sheet 153 from being curled or wrinkled. In addition, since the optical sheet 750 may prevent the second patterns 152 from being separated by using the second adhesive layer 156 and the protective layer 158, the adhesive force between the second patterns 152 may be enhanced.

Figure 11:
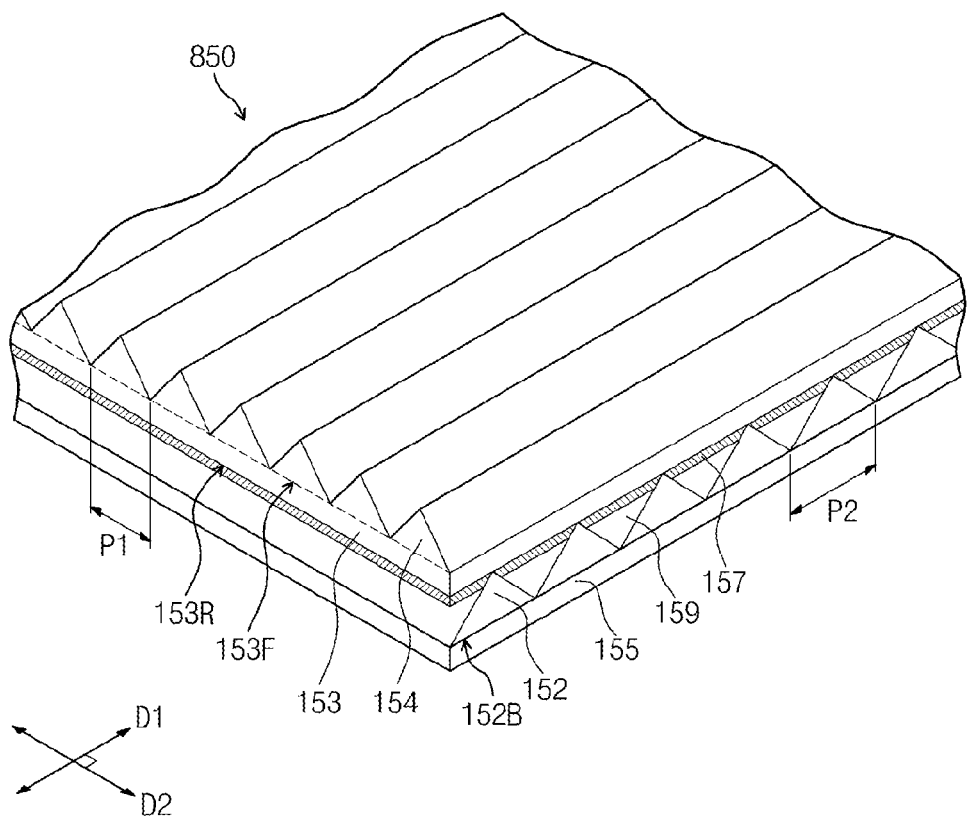
FIG. 11 is a perspective view showing an optical sheet according to an eighth exemplary embodiment.
Figure 12:
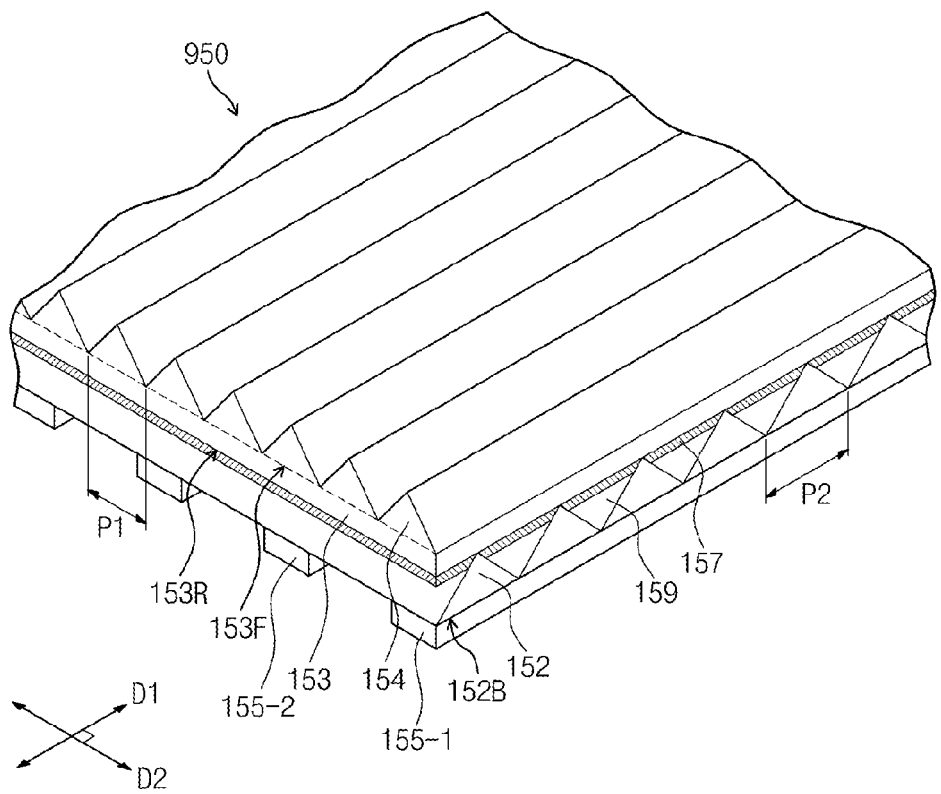
FIG. 12 is a perspective view showing an optical sheet according to a ninth exemplary embodiment.

FIG. 11 is a perspective view showing an optical sheet according to an eighth exemplary embodiment. FIG. 12 is a perspective view showing an optical sheet according to a ninth exemplary embodiment.

Referring to FIG. 11, an optical sheet 850 includes second patterns 152, each having a triangular prism shape. Except for the triangular rather than trapezoidal shape of the second patterns 152, the optical sheet 850 has the same structure and substantially same function as those of the optical sheet 250 according to the second exemplary embodiment as shown in FIGS. 4 and 5.

The optical sheet 850 includes one base sheet 153 to collect the light, and thus the manufacturing cost for the optical sheet 850 may be reduced. The optical sheet 850 may prevent the base sheet 153 from being curled or wrinkled. In addition, since the optical sheet 850 has a more perfect triangular prism shape approximation different from the shape of the optical sheet 250 as shown in FIGS. 4 and 5, the optical sheet 850 may have a better light-collecting efficiency compared with that of the optical sheet 250 shown in FIGS. 4 and 5. Further, the optical sheet 850 may prevent the second patterns 152 from being separated by using the protective layer 155, thereby enhancing the adhesive force between the second patterns 152.

Referring to FIG. 12, an optical sheet 950 includes second patterns 152, each having a triangular prism shape. Except for the shape of the triangular second patterns 152, the optical sheet 950 has the substantially same structure and substantially same function as those of the optical sheet 550 according to the fifth exemplary embodiment as shown in FIG. 8.

The optical sheet 950 includes one base sheet 153 to collect the light, and thus the manufacturing cost for the optical sheet 950 may be reduced. The optical sheet 950 may prevent the base sheet 153 from being curled or wrinkled. In addition, since the optical sheet 950 has a perfect prism shape approximation different from the shape of the optical sheet 550 as shown in FIG. 8, the optical sheet 950 may have the light-collecting efficiency compared with the optical sheet 550 shown in FIG. 8. Further, the optical sheet 950 may prevent the second patterns 152 from being separated by using the supporters 155-1 and 155-2, thereby enhancing the adhesive force between the second patterns 152.

FIGS. 13A to 13E are views showing a method of manufacturing an optical sheet 150 according to a first exemplary embodiment of the present disclosure. Hereinafter, the manufacturing method of the optical sheet 150 will be described in detail with reference to FIGS. 2, 3, and 13A to 13E.

Figure 13A:
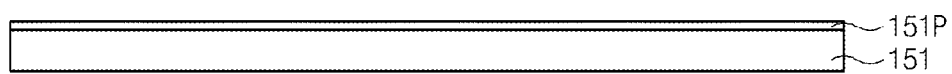
FIGS. 13A to 13E are views showing a method of manufacturing an optical sheet according to the first exemplary embodiment.

Referring to FIGS. 3 and 13A, before forming the second patterns 152, a release layer 151P is formed on one surface of an auxiliary base sheet 151 on which the second patterns 152 are thereafter formed. The auxiliary base sheet 151 may be rigid and may function as an initial but removable base on top of which subsequent layers are added. The release layer 151P may be formed by coating the one surface of the auxiliary base sheet 151 with a selectively removable polymer resin.

Figure 13B:
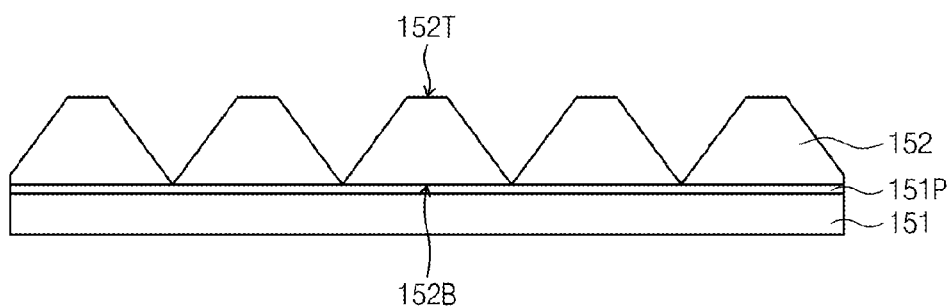

Then, as shown in FIG. 13B, the trapezoidal second patterns 152 are formed on the release layer 151P using for example an extrusion molding method or a soft molding method.

To this end, the polymer resin that is curable using UV radiation is coated on the release layer 151P and the polymer resin is brought to the half-cured condition by irradiation with the UV light, thereby forming a partially-cured polymer resin layer. The polymer resin should not be limited to the UV curable material, that is, the polymer resin may be a heat curable material, where in the latter case, IR heat lamps may be used.

In the case that the second patterns 152 are formed using the extrusion molding method, a master roll (not shown) is prepared to transfer the second patterns 152. The master roll is provided with reverse patterns formed a surface thereof to correspond to the topology of the top major surface of the second patterns 152. The master roll may be prepared in a cylinder-shape roller. In case of using the extrusion molding method, the surface of the cylinder-shape roller is scratched along the axis direction of the cylinder-shape roller by a grinder such as a diamond bite, so that a prism mountain pattern of which the top portion is cut away may be formed on the surface of the cylinder-shape roller.

Then, the master roll is rotated while being pressed to make contact with the auxiliary base sheet 151 on which the polymer resin layer is formed. When the master roll makes contact with the auxiliary base sheet 151, the topology of the second patterns 152 is created in the partially-cured polymer resin layer. Then, the polymer resin layer is further cured, thereby forming the second patterns 152 on the surface of the auxiliary base sheet 151.

In the case that the second patterns 152 being formed by using the soft molding method, a master mold (not shown) on which reverse patterns corresponding to required patterns are formed is prepared. Then, the master mold on which the reverse patterns are formed is pressed to make contact with the polymer resin layer. Accordingly, the reverse patterns are transferred to the polymer resin layer. Then, when the polymer resin layer is more fully cured, the second patterns 152 may be formed on the surface of the auxiliary base sheet 151.

Figure 13C:
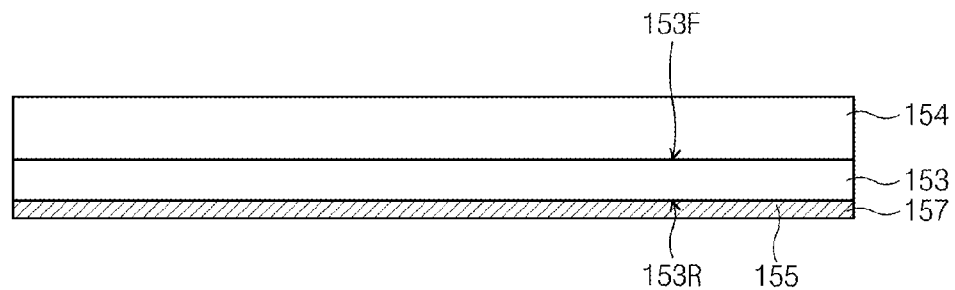

After that, or in parallel therewith, the material of the first patterns 154 are formed on the front surface 153F of the base sheet 153 as shown in FIG. 13C. Similar to the second patterns 152, the first patterns 154 may be formed on the front surface 153F of the base sheet 153 using the extrusion molding method or the soft molding method. In detail, the polymer resin that is curable using the UV radiation is coated on the front surface 153F of the base sheet 153 and the polymer resin is brought to a half-cured condition by irradiation of the UV light, thereby forming a polymer resin layer. Then, the cylinder-shape roller on which the reverse patterns are formed corresponding to the first patterns 154 is pressed to make contact with the polymer resin layer on the front surface 153F of the base sheet 153, or the master mode on which the reverse patterns are formed corresponding to the first patterns 154 is pressed to make contact with the polymer resin layer on the front surface 153F of the base sheet 153, thereby transferring the reverse patterns to the polymer resin layer. Next, when the polymer resin layer is more fully-cured, the first patterns 154 may be formed on the front surface 153F of the base sheet 153.

More specifically, and as shown in FIG. 13C, the adhesive layer 157 is then formed on the rear surface 153R of the base sheet 153 on which the first patterns 154 are formed. The adhesive layer 157 may be formed by coating a melted polymer resin or a half-cured polymer resin. The melted polymer resin is pre-cured until it is brought to the half-cured condition, and the polymer resin may be an UV curable polymer resin. In the present exemplary embodiment, the adhesive layer 157 is formed entirely on the rear surface 153R of the base sheet 153, but it should not be limited thereto. That is, the adhesive layer 157 may be formed partially on the rear surface 153R of the base sheet.

Figure 13D:
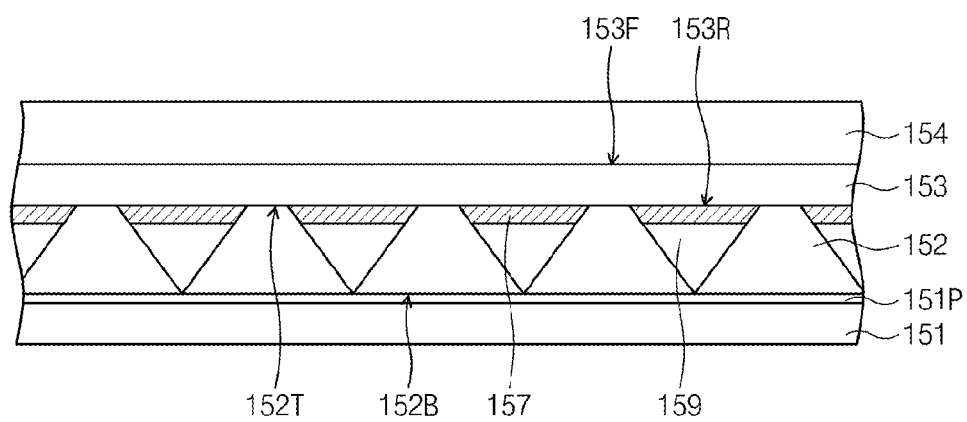

Then, as shown in FIG. 13D, the second patterns 152 are press attached to the rear surface 153R of the base sheet 153. In this case, the auxiliary base sheet 151 is pressed to the base sheet 153 such that the upper surface 152T of the first patterns 152 make substantially direct contact through the adhesive layer 157 with each other, and then the half-cured polymer resin is cured completely to thereby bond the layers together. Although not shown in FIGS. 13A to 13E, a portion of the adhesive layer 157 may remain between the upper surface 152T of the second patterns 152 and the rear surface 153R of the base sheet 153.

Figure 13E:
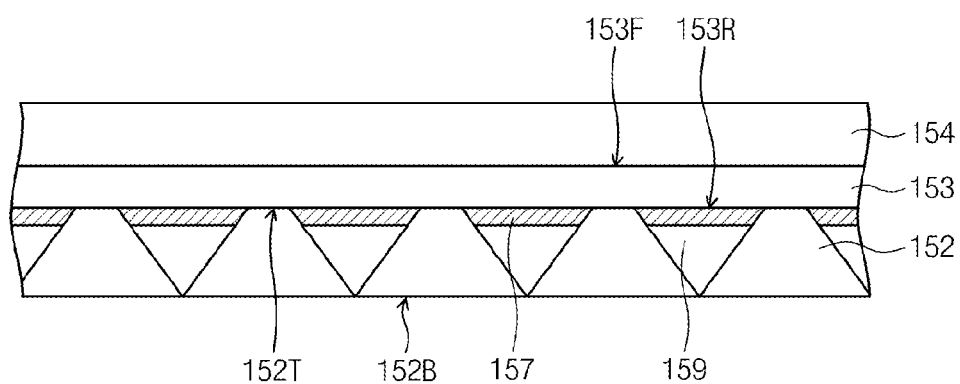

Referring to FIG. 13E, the auxiliary base sheet 151 disposed below the second patterns 152 is removed by using a solvent or other releasing agent to release the release layer. Thus, the optical sheet 150 shown in FIGS. 2 and 3 may be completely manufactured.

FIGS. 14A to 14E are views showing a method of manufacturing the optical sheet 250 according to the second exemplary embodiment of the present invention. In FIGS. 14A to 14E, the same reference numerals denote the same elements in FIGS. 13A to 13E, and thus detailed descriptions of the same elements will be omitted.

Figure 14A:
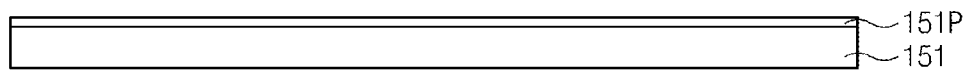
FIGS. 14A to 14E are views showing a method of manufacturing an optical sheet according to the second exemplary embodiment.

Referring to FIG. 14A, the release layer 151P is formed on the auxiliary base sheet 151. The processes of forming the release layer 151P are the same as the processes of forming the release layer 151P shown in FIG. 13A, so details thereof will be omitted.

Figure 14B:
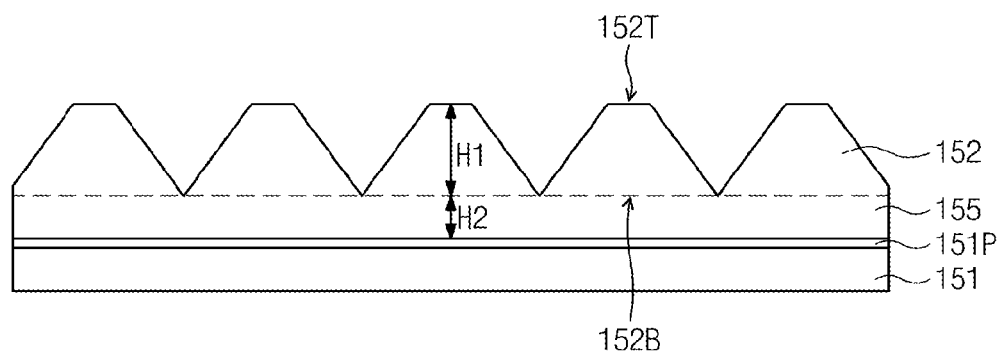

Then, as shown in FIG. 14B, the protective layer 155 and the second patterns 152 are formed on the release layer 151P. In the present exemplary embodiment, the protective layer 155 and the second patterns 152 may be formed through the single process.

In order to form the second patterns 152 and the protective layer 155, the half-cured polymer resin or the melted polymer resin is coated on the auxiliary base sheet 151. Then, the UV light or the heat is applied to the polymer resin on the auxiliary base sheet 151 to form the polymer resin layer. The polymer resin layer has a thickness the same as the sum of the height H1 of the second patterns and the thickness H2 of the protective layer 155.

After that, as described with reference to FIG. 13B, after the second patterns 152 are formed by using the extrusion molding method or the soft molding method, the polymer resin layer is cured using the UV light or the heat. In this case, the height of the reverse patterns formed on the master roll or the master mold is the same as the height H1 of the second patterns 152. Accordingly, the second patterns 152 are transferred to the polymer resin layer by the height H1 of the second patterns 152 from the upper surface of the polymer resin layer, and the second patterns 152 are not formed in other portion. Thus, the protective layer 155 remains in the other portion in which the second patterns 152 are not formed.

Figure 14C:
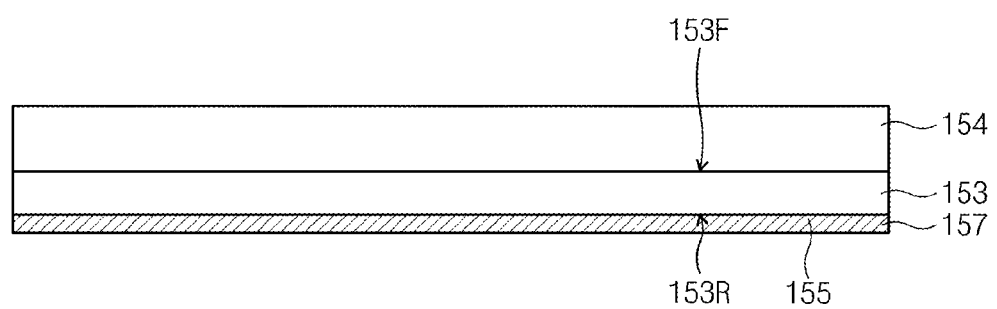
Figure 14D:
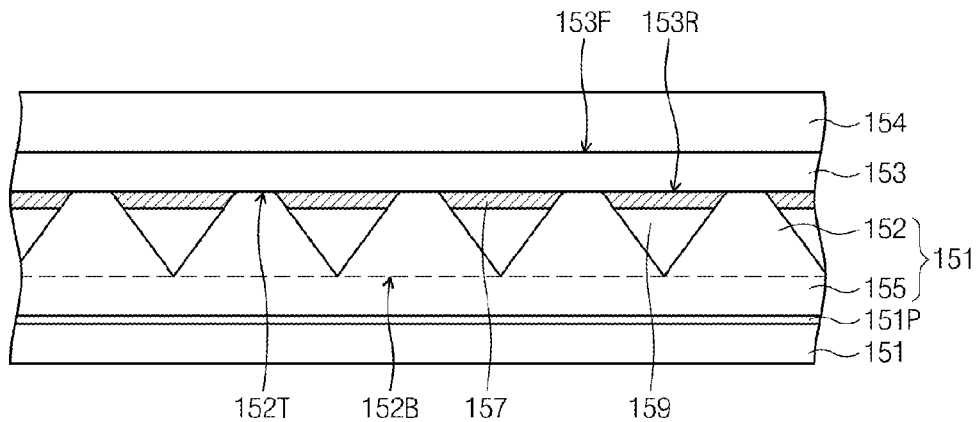

Then, the first patterns 154 are formed on the base sheet 153 and the adhesive layer 157 is formed on the rear surface 153R of the base sheet 153 as shown in FIG. 14C. As shown in FIG. 14D, the base sheet 153 is coupled by press attachment with the auxiliary base sheet 151, and the adhesive layer 157 is more fully cured. Since the processes shown in FIGS. 14C and 14D are the same as the processes shown in FIGS. 13C and 13D, details thereof will be omitted.

Figure 14E:
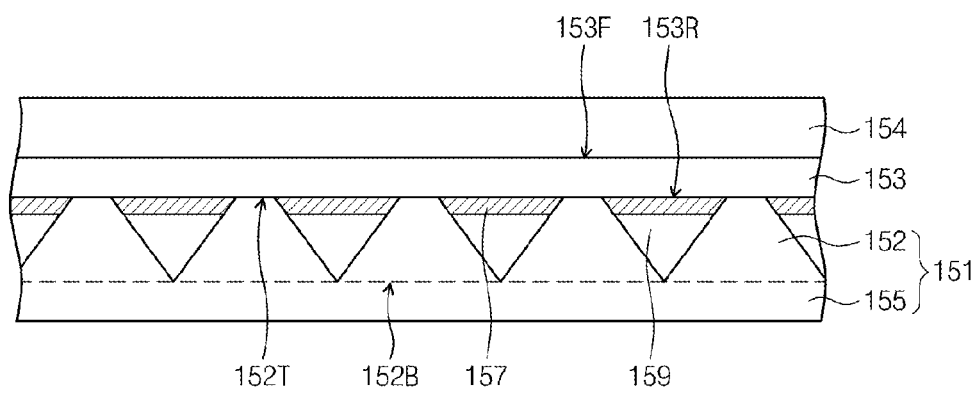

As shown in FIG. 14E, when the auxiliary base sheet 151 is removed (released away), the optical sheet 250 shown in FIGS. 4 and 5 is manufactured.

In the present exemplary embodiment, the protective layer 155 is formed together with the second patterns 152, but it should not be limited thereto. That is, the protective layer 155 may be formed by coating the polymer resin on the rear surface 153R of the base sheet 153 after removing the auxiliary base sheet 151.

In addition, in the first and second exemplary embodiments, the optical sheet 150 is manufactured by coupling the base sheet 153 with the auxiliary base sheet 151, on which the second patterns 152 are formed, after the first patterns 154 are formed on the base sheet 153. However, the first patterns 154 may be formed on the front surface 153F of the base sheet 153 after coupling the base sheet 153 with the auxiliary base sheet 151 on which the second patterns 152 are formed before the first patterns 154 are formed.

Although the exemplary embodiments in accordance with the present teachings have been described, it is understood that the present disclosure should not be limited to these exemplary embodiments but various changes and modifications can be made by one ordinary skilled in the art in light of the foregoing and within the spirit and scope of the present teachings.

What is claimed is:

1. An optical sheet comprising:
   a light-passing base sheet having a first surface and a second surface facing the first surface;
   a plurality of light-passing first patterns disposed on the first surface of the base sheet;
   a plurality of light-passing second patterns, each combined with the second surface of the base sheet; and
   an inner layer disposed between the plurality of light-passing second patterns and the light-passing base sheet and having a refractive index greater than refractive indices of plurality of light-passing second patterns.

2. The optical sheet of claim 1, wherein each of the plurality of light-passing second patterns comprises an upper surface substantially parallel to the second surface of the base sheet and an lower surface substantially parallel to the upper surface and the lower surface has a width longer than the upper surface in a first direction.

3. The optical sheet of claim 2, further comprising a first adhesive layer disposed on the second surface of the base sheet, wherein the first adhesive layer is contacted with the inner layer.

4. The optical sheet of claim 3, wherein a height is defined from the lower surface to the first adhesive layer has a value of about 75% of a height of each of the plurality of light-passing second patterns.

5. The optical sheet of claim 1, wherein each of the plurality of light-passing first patterns has a prismatic shape extending longitudinally in the first direction.

6. The optical sheet of claim 5, wherein each of the plurality of light-passing second patterns has a prismatic shape extending longitudinally in a second direction substantially perpendicular to the first direction.

7. The optical sheet of claim 1, wherein each of the plurality of light-passing second patterns has a lower surface, and the lower surface of each of the plurality of light-passing second patterns is connected to the lower surface of adjacent second pattern through an end thereof.

8. The optical sheet of claim 7, further comprising a second adhesive layer disposed between two adjacent ones of the plurality of light-passing second patterns to thereby connect the ends of the two adjacent second patterns to each other.

9. The optical sheet of claim 7, further comprising a protective layer disposed on the lower surface of the plurality of light-passing second patterns.

10. The optical sheet of claim 9, wherein the protective layer is integrally formed with the plurality of light-passing second patterns and comprises a same material as the plurality of light-passing second patterns.

11. The optical sheet of claim 9, wherein the protective layer has a first protective pattern and a second protective pattern being apart from the first protective pattern, the first protective pattern and the second protective pattern extend in the first direction.

12. The optical sheet of claim 9, wherein the protective layer comprises a material different from the base sheet.

13. The optical sheet of claim 9, wherein the protective layer has a thickness corresponding to a value of about 25% or more of the height of the plurality of light-passing second patterns, and the base sheet has a thickness larger than two times the height of the plurality of light-passing second patterns.

14. The optical sheet of claim 1, wherein each of the plurality of light-passing first patterns has a lenticular shape extending longitudinally in the first direction.

15. The optical sheet of claim 14, wherein each of the plurality of light-passing second patterns has a lenticular shape extending longitudinally in a second direction substantially perpendicular to the first direction.

16. A method of manufacturing an optical sheet, comprising:
   forming a plurality of light-passing second patterns on one surface of an auxiliary base sheet to allow the plurality of light-passing second patterns to protrude above the auxiliary base sheet;
   forming a plurality of light-passing first patterns on a front surface of a base sheet to allow the plurality of light-passing first patterns to protrude above the base sheet;
   forming a first adhesive layer on a rear surface of the base sheet;
   coupling the plurality of light-passing second patterns that are disposed on the auxiliary base sheet with the base sheet such that the plurality of light-passing second patterns make contact with the first adhesive layer, wherein an inner layer is defined between the plurality of light-passing second patterns and the base sheet and the inner layer has a refractive index greater than refractive indices of plurality of light-passing second patterns; and
   removing the auxiliary base sheet.

17. The method of claim 16, further comprising forming a release layer on the one surface of the auxiliary base sheet prior to forming the plurality of light-passing second patterns to attach or detach the plurality of light-passing second patterns.

18. The method of claim 16, wherein the first adhesive layer comprises an ultraviolet light curable resin.

19. The method of claim 16, wherein the forming of the plurality of light-passing second patterns further comprises forming a protective layer between the auxiliary base sheet and the plurality of light-passing second patterns.

20. The method of claim 19, wherein the second plurality of light-passing patterns comprise a same material as the protective layer, the protective layer comprises a material different from the base sheet, and the second plurality of light-passing patterns and the protective layer are integrally formed through a single process.

21. The method of claim 16, further comprising forming a second adhesive layer between two adjacent second patterns to connect ends of the plurality of light-passing second patterns to each other prior to coupling the auxiliary base sheet with the base sheet.

22. The method of claim 16, further comprising forming a protective layer on the lower surface of the plurality of light-passing second patterns after removing the auxiliary base sheet.

* * * * *